(12) United States Patent
Ho et al.

(10) Patent No.: US 6,401,103 B1
(45) Date of Patent: Jun. 4, 2002

(54) APPARATUS, METHOD, AND ARTICLE OF MANUFACTURE FOR CLIENT-SIDE OPTIMISTIC LOCKING IN A STATELESS ENVIRONMENT

(75) Inventors: Shyh-Mei Ho, Cupertino; Vern Lee Watts, Los Altos, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/369,943

(22) Filed: Aug. 6, 1999

(51) Int. Cl.[7] .............................................. G06F 17/30
(52) U.S. Cl. ...................... 707/201; 709/229
(58) Field of Search .................... 707/3, 503, 101–104, 707/201–203; 709/224, 223, 231, 204, 103, 229; 717/11, 5; 705/35; 711/13

(56) References Cited

U.S. PATENT DOCUMENTS

| | | | | |
|---|---|---|---|---|
| 5,493,728 A | * | 2/1996 | Solton et al. | 711/13 |
| 5,649,195 A | * | 7/1997 | Scott et al. | 707/201 |
| 5,737,536 A | * | 4/1998 | Herrmann et al. | 709/229 |
| 5,751,958 A | * | 5/1998 | Zweben et al. | 709/204 |
| 5,752,042 A | * | 5/1998 | Cole et al. | 717/11 |
| 5,758,355 A | * | 5/1998 | Buchanan | 707/201 |
| 5,761,670 A |   | 6/1998 | Joy | 707/103 |
| 5,765,171 A | * | 6/1998 | Gehani et al. | 707/203 |
| 5,802,062 A |   | 9/1998 | Gehani et al. | 370/465 |
| 5,835,904 A | * | 11/1998 | Vick et al. | 707/1 |
| 5,991,542 A | * | 11/1999 | Han et al. | 717/11 |
| 6,157,935 A | * | 12/2000 | Tran et al. | 707/503 |

FOREIGN PATENT DOCUMENTS

WO    WO 98/54662    12/1998    ........... G06F/17/30

OTHER PUBLICATIONS

IBM TDB 11/90, pp. 137–138.

* cited by examiner

*Primary Examiner*—John Breene
*Assistant Examiner*—Mohammad Ali
(74) *Attorney, Agent, or Firm*—John R. Thompson; Madson & Metcalf

(57) ABSTRACT

The invention is an optimistic locking mechanism which allows Internet access to a database while maintaining data integrity in a stateless web environment. One embodiment of the invention incorporates a conventional IMS residing on a host computer and includes a generic transaction module which retrieves original data segments from the an IMS database in response to a search request from a web user. This embodiment of the invention further includes a server-side interface module for duplicating the original data segment into identical lines of data segments. One data segment may be updated by a web user whereas the other data segment remains constant and serves as a reference of the original state of the data segment. Both data segments are transmitted to a web user who may make changes to one data segment but not the other. Both data segments are returned, and the generic transaction module compares the state data segment to a current data segment to determine if the web user updates were based on the current state. If so, the IMS is updated to reflect the web user updates. If the web user updates were not based on the current state, the data segments are updated to reflect the current state and are then retransmitted to the web user. In this manner, a web user is allowed to update only data segments which are current, thereby maintaining integrity of the database.

32 Claims, 4 Drawing Sheets

| SELECT | TELEROOT TELEKEY | TELEDIR EMPNO | EMPNO | LNAME | FNAME | EXTNUM | ZIPCODE |
|---|---|---|---|---|---|---|---|
|  | DQE | 123896 | 123896 | MCBRIDE | TOM | 3-4567 | 95401 |
|  | DQE | 776332 | 776332 | HO | MARY | 3-2570 | 95401 |

*Fig. 3*

| SELECT | TELEROOT TELEKEY | TELEDIR EMPNO | EMPNO | LNAME | FNAME | EXTNUM | ZIPCODE |
|---|---|---|---|---|---|---|---|
|  | DQE | 123896 | 123896 | MCBRIDE | TOM | 3-4567 | 95401 |
|  | DQE | 123896 | 123896 | MCBRIDE | TOM | 3-4567 | 95401 |
|  | DQE | 776332 | 776332 | HO | MARY | 3-2570 | 95401 |
|  | DQE | 776332 | 776332 | HO | MARY | 3-2570 | 95401 |

*Fig. 4*

| SELECT | TELEROOT TELEKEY | TELEDIR EMPNO | EMPNO | LNAME | FNAME | EXTNUM | ZIPCODE |
|---|---|---|---|---|---|---|---|
|  | DQE | 123896 | 123896 | MCBRIDE | TOM | 3-1234 | 95401 |
|  | DQE | 123896 | 123896 | MCBRIDE | TOM | 3-4567 | 95401 |
|  | DQE | 776332 | 776332 | HO | MARY | 3-2570 | 95401 |
|  | DQE | 776332 | 776332 | HO | MARY | 3-2570 | 95401 |

*Fig. 5*

APPARATUS, METHOD, AND ARTICLE OF MANUFACTURE FOR CLIENT-SIDE OPTIMISTIC LOCKING IN A STATELESS ENVIRONMENT

BACKGROUND OF THE INVENTION

1. The Field of the Invention

The present invention relates to data base management, and more specifically, to mechanisms for accessing and editing records of a database across the Internet while maintaining data integrity.

2. The Relevant Technology

Conventional mainframe databases have proven extremely useful and necessary for data management by various entities. Mainframe databases must be extremely reliable and are in many instances capable of handling large transactional loads. One example of such a database management system is the Information Management System (IMS) available from IBM Corp., Armonk, N.Y. An IMS system[s] allows access to one or more databases in order for users to interact with the data maintained on the database. The majority of user access involves transaction. Transactions may involve incorporating business logic into database updates. Integrity and verification of database updates are protected by ensuring that business logic has been applied and that editing rules are confirmed. In this manner, database updates are guaranteed to be correct.

Throughout, reference will be made to an IMS database management system running on a mainframe computer with accompanying middleware acting as World Wide Web server for allowing Internet access to the database. This is an exemplary environment only and the invention presented hereafter will apply to any Internet accessible database or other database in a stateless environment. For example, a web-accessible relational database, such as Oracle 8i, IBM DB2, or Microsoft SQL Server 7.0, would encounter the same problems presented hereafter and could equally make use of the present invention. Furthermore, the present invention provides benefit in any stateless situation when it is unknown at the time of a database request, when, if ever, the requestor will return with modified data for update into the database.

Sensitive information, such as payroll systems, are not allowed to be accessed or updated absent this form of guarantee. For example, in a financial transfer between two accounts, one account is credited and another account is debited. The system must handle this transfer as one unit even though accessing two independent databases. In order to ensure that each database update is correct, this transaction must be verified for both databases in order to confirm and complete the transaction. Otherwise, the transaction is not allowed to proceed.

IMS systems are frequently made accessible over closed networks such as LANs and WANs in order to enable users on the network to make transactions on an enterprise's database. More recently, IMS systems have been made accessible to users communicating across the Internet to enable user transactions on the database. Such Internet-enabled use provides users physically remote to the enterprise with the ability to transact with the databases.

Generally, these outside users are allowed to access data that does not have critical data elements. Such nonsensitive data need not have business data, database logic, and business rules applied thereto. Nonsensitive data may include, for example, a customer's name, address file, telephone number etc. Thus, users such as a customer are able to access the database through the Internet and are provided with the ability to alter only nonsensitive data.

Generally, outside users access the IMS system through conventional browser technology. Through the browser, the user may request specific data from the IMS system. In response, the IMS accesses and transmits the nonsensitive information to be displayed by the browser for the user's review. The user may then access the displayed information, update it according to the user's needs, and transmit the updated data back to the IMS system.

While standard business database logic and rules need not be applied to nonsensitive information, any modifications to the data must still follow standard integrity, serialization, and locking rules. For instance, conventional locking standards require that when a user retrieves data that is to be updated, the data must be locked so that it cannot be changed until the update is completed. After the update is completed, the data is sent back to the IMS system, which commits the changes to the system. Because the data was locked, the data is maintained internally consistent until the changes are logged and the data is again opened for user access.

An Internet system for accessing data from a database is absent many advantages of a conventional network system. For example, a web user does not necessarily stay connected to the system during a transaction, and the system is not able to track what the user is doing with data downloaded to the web browser. Additionally, the system does not know when a web user intends to enter data or update data, nor does the system know if or when the web user will return any updates or if the web user has terminated a connection with the system. Thus, conventional locking systems are not effective in an Internet environment. A locking mechanism is generally unable to lock data upon transmission of the data to a web browser, because the system does not know when to unlock the data.

A conventional technique known as optimistic locking has been used to eliminate the need for locking data for long periods of time during data transmissions over the web. Optimistic locking assumes that the data need not be locked, because it is not likely that anyone else is going to change the data. Therefore, the data is not locked, but is checked to verify whether anyone has changed any data before the web user makes the update.

Optimistic locking requires a host to remember an initial state of all data sent by the host to the web user. When the web user returns updated data, the host checks the data to verify that the original data sent to the user is still current. If so, the updated data is verified as being based on the current data, and is entered into the system. If the original data has been modified, the update is not allowed to occur, and the user is notified of the modified data.

Optimistic locking mechanisms are very effective in dealing with database updates in certain instances, such as when dealing with relatively few active web users. For example, a host dealing with only ten users at a time can easily accommodate and remember ten initial states. Difficulty arises when a host must dedicate resources to retaining thousands or millions of states. Systems open to Internet access are such an environment, as the web allows millions of users to access an IMS system at any given time. In order to accommodate such vast numbers of web users, a host would be forced to maintain an elaborate state table and dedicate substantial resources to maintaining the state table. Such a burden on a host's resources may easily exceed what the host is effectively able to manage.

Thus, from the above discussion, it is apparent that it would be advantageous to accommodate Internet-enabled transactions on a database, while retaining the advantages of optimistic locking mechanisms. It would also be advantageous to provide an optimistic locking mechanism that is efficient and highly scalable, in order to accommodate the large numbers of users that may access a database over the Internet. It would similarly be an advantage to provide an optimistic locking mechanism that operates in conjunction with conventional web browsers and with conventional IMS systems. It would be a further advantage to provide an optimistic locking system that is capable of reliably and cost-effectively implementing Internet access of an IMS system.

OBJECT AND BRIEF SUMMARY OF THE INVENTION

The apparatus of the present invention has been developed in response to the present state of the art, and in particular, in response to the problems and needs in the art that have not yet been fully solved by currently available data integrity verification and locking mechanisms. Thus, it is an overall objective of the present invention to provide an optimistic locking mechanism which allows Internet access to a database while maintaining data integrity in such a web environment.

The present invention is described as a method, computer program product, and system for client-side optimistic locking in a stateless environment is presented. A database is accessible by a requestor. The requestor may be an Internet-enabled application that makes database requests over the Internet, a webserver allowing users to access a database, an application making direct requests to the database over any communications network, such as LAN, WAN, Internet, etc., or any other agent or combination of agents communicating data requests to the database.

It is important that the requestor contain a portion or client that is distributed on a different computer system than contains the database and database management system. This "client" portion will receive and store the state data as explained hereafter. For example, a webserver may communicate with a database management system to access data that is served as HTML pages to a browser using the Internet as a communications network and the Hyper Text Transport Protocol to transfer the accessed data. The "client" portion would be the browser combined with the HTML page. Requestor refers to all components, code, etc. that handles data from a database to a client over a communications network, including the client portion.

In response to a request, the database will send state data showing the state of the data at the time the request was serviced (e.g., received by the database management system). When the requestor desires to change (e.g., update) the requested data in the database, the requestor will send, and the database management system will receive, both the state data and the changed or modified state data (i.e., "modified data"). In this sense, an optimistic lock is performed on the data that is managed and stored by the client portion of the requester.

The database management system may receive at some future point in time both the state data, representing the previous state of the system at the time of the initial request, and the modified data (i.e., the state data with the desired changes). Upon receipt, the database management system simply checks to see if the state data is the same as the current data in the database. If so, then the client-side optimistic lock succeeded and it is okay to update the database. If it is not the same, then the data has been previously modified since the requestor originally received the state data and the client-side optimistic lock failed.

On major advantage of the client-side optimistic locking mechanism is that all the state data is stored by the client and the database and database management system need to store and manage a minimal amount of information and do not have the added complexity that may frustrate even attempting any form of optimistic locking. This is particularly important when allowing Internet-based access to existing databases using the stateless web protocol, HTTP.

To achieve the foregoing object, and in accordance with the invention as embodied and broadly described herein, one embodiment of an Internet-enabled locking mechanism of the present invention is described herein. The Internet-enabled locking mechanism, in the embodiment to be described and illustrated herein, incorporates a conventional IMS residing on a host computer. The IMS is configured with a memory and a modules including a generic transaction module stored in the memory and executable by a processor. The generic transaction module is configured to retrieve data requested by a web user, referred to herein as an "original data segment," from the IMS in response to a search request from the web user.

The modules stored in the memory further include a server-side interface module. The server-side interface module duplicates the original data segment into two identical lines of data segments formatted as a modifiable data segment and a state data segment. The modifiable data segment is displayable to and modifiable by a web, whereas the state data segment, which always accompanies the modifiable data segment, is not displayable to the web user and may not be modified.

When the web user requests data from the database, the modifiable and state data segments are accessed by a server, which incorporates the data segments into a web page format. The thusly formatted modifiable and state data segments are then transmitted over the Internet by the server to the web user, who is able to view the modifiable data segment with a conventional web browser.

The web user may update the modifiable data segment and transmit the modifiable data segment back to the server for entry into the database. The modifiable data segment is sent to the server, in such an instance, and the accompanying state data segment—which is not modified—is also sent, preferably concurrently and transparently. The state data segment remains constant throughout all transmissions of the modifiable and state data segments.

The generic transaction module receives the modifiable and state data segments and compares the state data segment with a current data segment stored in the IMS. The current data segment represents the current state of the original data segment. The generic transaction module determines whether the state data segment and the current data segment are equivalent and, if so, alters the current data segment to reflect the updated modifiable data segment.

If the state data segment and the current data segment are not equivalent, the generic transaction module does not enter the updates from the web user. Instead, the generic transaction module updates the modifiable and state data segments to reflect the current data segment and transmits the modifiable and state data segments to the web user.

Under the present invention, a web user is allowed to update only data segments of a database that are current. Data integrity within the database is thereby maintained.

Maintaining database integrity during web transactions is not overly burdensome on a host database system under the present invention, as reference state data segments are maintained external to the host, thereby preserving the host's resources and allowing for high user scalability. The present invention provides the benefits of optimistic locking to Internet access of databases, and employs conventional browser and server technology in so doing.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 is a table displaying one embodiment of data segments used by the Internet-enabled data locking system of FIG. 2.

FIG. 4 is the table of FIG. 3 modified to show all data segments used by the Internet-enabled data locking system of FIG. 2.

FIG. 5 is the table of FIG. 4 modified to show an updated data segment.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

FIGS. 1 through 6 are schematic block diagrams and flow charts that illustrate in more detail the preferred embodiments of the present invention. The schematic block diagrams illustrate certain embodiments of modules for performing various functions of the present invention. In general, the represented modules include therein executable and operational data for operation within a computer system of FIG. 1 in accordance with the present invention.

As used herein, the term executable code, or merely "executable," is intended to include any type of computer instruction and computer executable code that may be located within a memory device and/or transmitted as electronic signals over a system bus or network. An identified module of executable code may, for instance, comprise one or more physical or logical blocks of computer instructions which may, for instance, be organized as an object, procedure, or function. Nevertheless, the executables of an identified module need not be located together, but may comprise disparate instructions stored in different locations which together comprise the module and achieve the purpose stated for the module. Indeed, an executable may be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may at least partially exist merely as electronic signals on a system bus or network.

Figure 1:
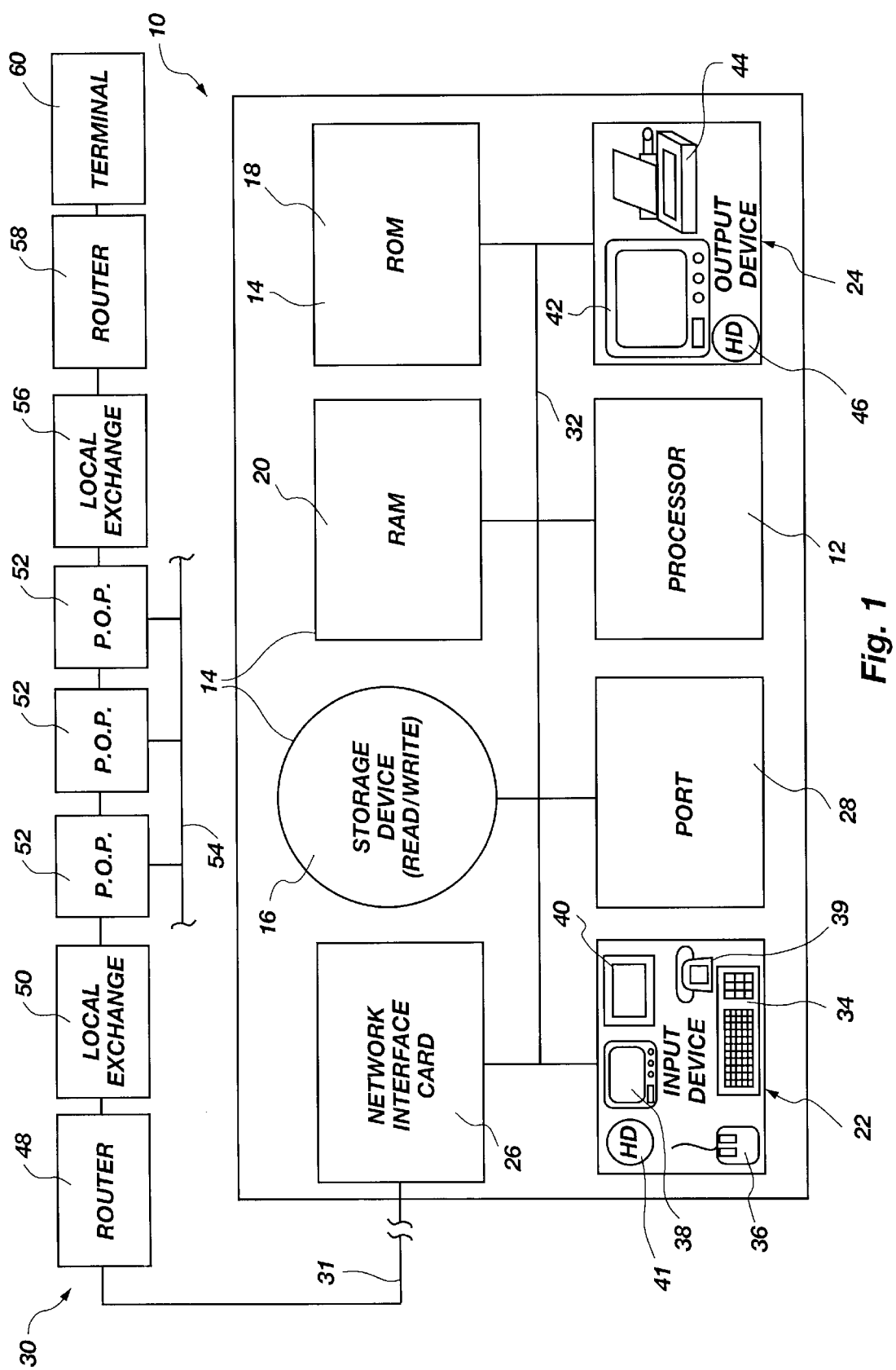
FIG. 1 is a schematic block diagram illustrating one embodiment of a computer system for implementing an Internet-enabled data locking system of the present invention.

FIG. 1 is a schematic block diagram that illustrates a computer system in which executable and operational data, operating in accordance with the present invention, may be hosted on one or more stations 10, 60 in a network 30. The network 30 may comprise a local area network (LAN), a wide area network (WAN), and may also comprise an interconnected system of networks, one particular example of which is the Internet and the World Wide Web supported on the Internet.

Referring again to FIG. 1, a computer station 10 typically includes a processor 12. The processor 12 may be operably connected to a memory 14. The memory 14 may include one or more devices such as a hard drive 16 or other non-volatile storage device 16, a read-only memory (ROM) 18 and a random access (e.g. volatile) memory (RAM) 20.

The computer station 10 may also include an input device 22 for receiving inputs from a user or another device. Similarly, an output device 24 may be within or be accessible from the computer station 10. A network interface card 26 or port 28 may be provided for connecting to outside devices, such as the network 30. In the case where the network 30 is remote from the computer station, the network interface card 26 may comprise a modem, and connect to the network 30 through a local access line 31, typically a telephone line.

Internally, a system bus 32 may operably interconnect the processor 12, memory devices 14, input devices 22, output devices 24, network card 26 and port 28. The system bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

The input devices 22 may include one or more physical embodiments. For example, a keyboard 34 may be used for interaction with the user, as may a mouse 36. A touch screen 38, a telephone 39, or simply the telephone line 31, may be used for communication with other devices, with a user, or the like. Similarly, a scanner 40 may be used to receive graphical inputs which may or may not be translated to other character formats. A hard drive 41 or other memory device 14 may be used as an input device whether resident within the computer station 10 or some other terminal 60 on the network 30, or from another interconnected network (e.g. a network formed by a Point of Presence (P.O.P.) 52, a local exchange 56, a router 58, and the terminal 60).

The output devices 24 may likewise include one or more physical hardware units. For example, in general, the port 28 may be used to accept inputs and send outputs from the computer station 10. Additionally, a monitor 42 typically provides outputs to a user for feedback during operation of the computer station 10, e.g., for assisting two-way communication between the processor 12 and a user. A printer 44 or a hard drive 46 may be used as output devices 24 for outputting information generated or otherwise collected withing the computer station 10.

In general, the computer station 10 may be connected as a terminal 60 to the network 30. In one manner of connection, common on the Internet, the computer station 10 is connected through a modem 26 through the local access line 31 to a router 48. The router 48 is typically a local telephone presence managed by a local service provider. The router directs communication to a local exchange 50, which is typically a public telephone company switching center.

Once within the public telephone company, the communications are routed to a regional switching center, or P.O.P. 52. The P.O.P. 52 connects over a backbone 54 with the other points of presence 52, which in turn connect other terminals such as the terminal 60 through local exchanges such as the local exchange 56 and routers such as the router 58. As other manners of network interconnection exist and are well known, the illustrated configuration is given only as one representative example.

In general, the network 30 may comprise a single local area network, a wide area network, several adjoining networks, an intranet, or as in the manner depicted, a system of interconnected networks such as the Internet. The individual terminals 60, 10 on the network may have varying degrees and types of communication capabilities and logic capability. Different communication protocols, e.g., ISO/OSI, IPX, TCP/IP, may be used on the network, but in the illustrated case of the Internet, a single, layered communications protocol (TCP/IP) enables communications between the differing networks and terminals.

In general, the network 30 allows terminals such as the terminals 60, 10 to communicate with each other, with application servers (not depicted), and with input/output resources such as the printer 44 or scanner 40. In so doing, a communication link may exist, in general, between any pair of devices.

Figure 2:
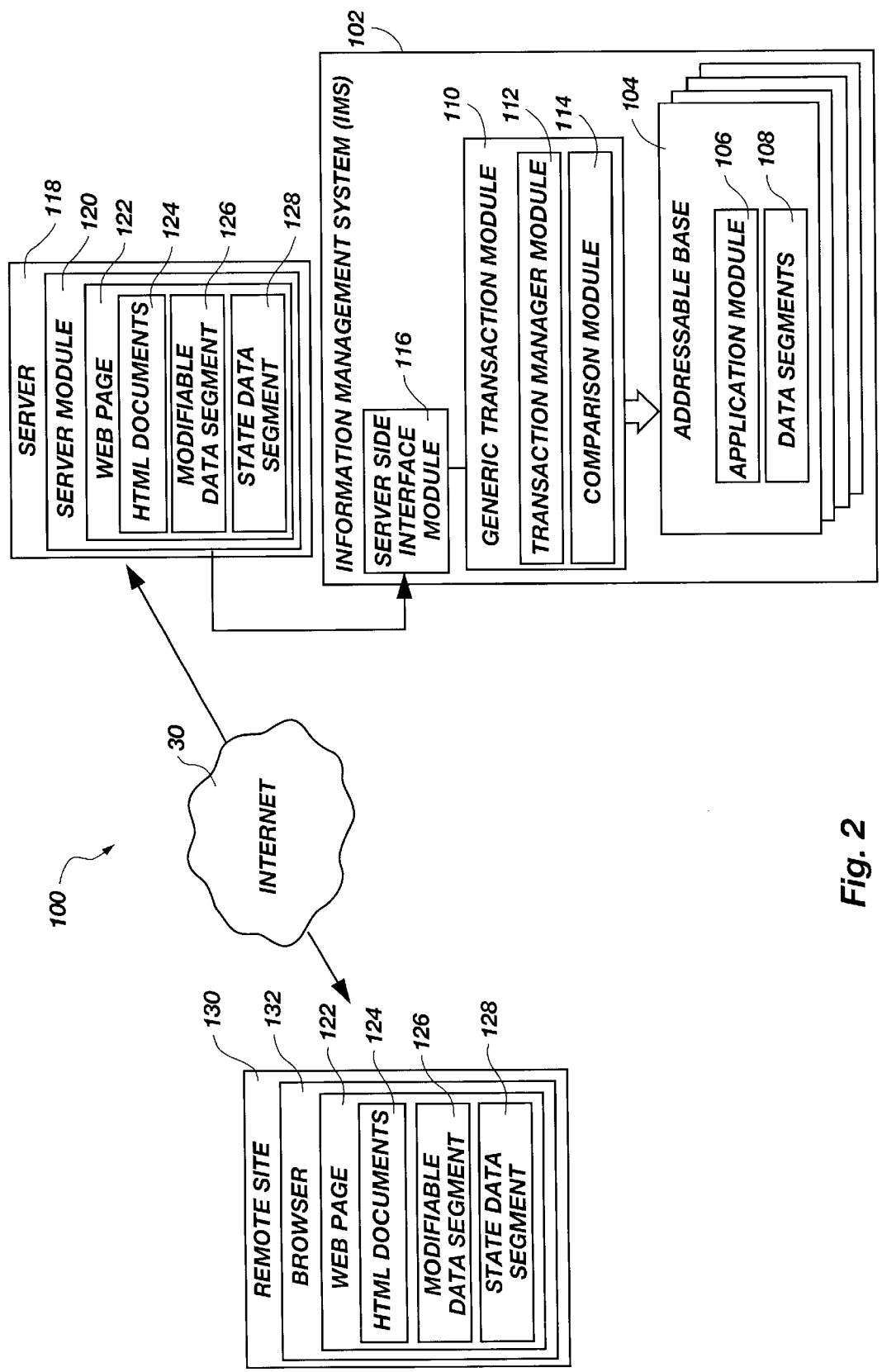
FIG. 2 is a schematic block diagram illustrating one embodiment of a system for employing an Internet-enabled data locking system of the present invention, including modules for executing the functions of the invention on the computer system of FIG. 1.

Referring now to FIG. 2, the present invention, in one embodiment, includes a plurality of modules containing executable code and operational data suitable for operation within the memory devices 14 of FIG. 1, including the hard drive 41, the storage device 16, the RAM memory 20, and the ROM memory 18. The memory devices 14 may be located within the local computer station 10, or within a remote station 60. The memory devices 14 may also be distributed across both local stations 10 and remote stations 60.

As shown in FIG. 2, the present invention is embodied as an Internet-enabled data locking system 100. In the depicted embodiment, the present invention incorporates the use of a conventional information management system (IMS) 102. The IMS 102 is preferably a multiple address-based system for managing, accessing and transacting with one or more addressable bases 104. Each addressable base 104 may be an individual database or a component of or set of records within a database. The depicted addressable base 104 includes an application module 106 for management of its respective addressable base 104. The addressable base 104 further includes data such as data segments 108, organized in various formats.

In one embodiment, the IMS 102 is embodied as a hierarchical database. The Internet-enabled data locking system 100 is suitably adapted for use with relational and object oriented databases as well. The IMS 102 is shown provided with a generic transaction module 110. The generic transaction module 110 preferably locates and retrieves specific data segments 108 in their respective addressable bases 104. The generic transaction module 110 operates in conjunction with the application module 106 in retrieving the data segments 108. The generic transaction module 110 is shown provided with a transaction manager module 112 which is assigned primarily responsibility for locating and finding specific data segments 108.

The generic transaction module 110 is also shown including a comparison module 114. In the depicted embodiment, the comparison module is used to compare data segments 108 in a manner to be described below.

The Internet-enabled data locking system 100 is also shown provided with a server-side interface module 116. The depicted server-side interface module 116 formats data segments 108 and delivers the data segments 108 to the server 118. In the embodiment of FIG. 2, the server-side interface module 116 is resident in the information management system 102. In an alternative embodiment, the server-side interface module 116 is resident in the server 118.

The server 118 is resident on a computer station 10. The IMS 102 may be resident on the same computer station 10, or on a communicating computer station 10. Together the servers 118 and the IMS 102 are defined as a host. The server 118 is preferably configured with conventional server software such as a server module 120 which handles the uploading and downloading of web pages 122 across the Internet 30.

The depicted web page 122 contains conventional HTML documents 124. The HTML documents 124 are used for formatting and defining web pages 122 and contain conventional tags and objects for this purpose. The web page 122 further contains data segments 126 and 128. The data segments 126 and 128 are herein referenced as modifiable and state data segments 126, 128 and reflect a specific data segment 108 which was originally resident in the addressable base 104. The modifiable and state data segments 126, 128 are discussed in greater detail below.

The server 118 is shown operably connected to the Internet 30 for downloading and uploading of data as web pages 122. A remote site 130 corresponds to a remote terminal 60 of FIG. 1 and is connected though the Internet 30 with the computer station 10 on which the host is operating. The remote site is configured for downloading and uploading web pages 122 in a manner known in the art.

As depicted, the remote site 130 is provided with a conventional browser 132. The browser 132 formats and constructs the web page 122 by interpreting HTML documents 124 received from the server 118. Under the present invention, the web page 122 transmitted by the server 118 to the remote site 130 contains the modifiable and state data segments 126, 128. Nevertheless, the modifiable and state data segments 126, 128 may be transmitted in any suitable manner.

One advantage of the present invention is that the remote site 130 must be configured only with a universal browser 132 in order for the web user to interact with the Internet-enabled data locking system 100. Thus, the present invention has a significant advantage over conventional network systems which require client-specific and server-specific software to be installed at all remote sites in order for the client and the server to interact with one another. Of course, the present invention could be implemented with such specific types of software, but in order to realize the fullest advantage of the present invention, the depicted manner of configuring the remote site 130 with only the universal browser 132 is preferred.

In operation, a web user located at the remote site 130 utilizes the browser 132 to send a request for a data segment 108 stored on the IMS 102. This request is sent across the Internet 30 to the server 118, where the request is interpreted by the server module and delivered to the server-side interface module 116. The server-side interface module 116 formats the request into a format readable by the generic transaction module 110. The request may also be examined according to the web user's privileges on the system 100, such that only data segments 108 for which the user is authorized are returned.

The transaction manager module 112 reads the request and, in conjunction with the application module 106, addresses the appropriate addressable base 104 and retrieves one or more database segments 108 that satisfy the request. For the purposes of this discussion, the present invention will be initially described with reference to only a single data segment 108.

As used herein, the term "data segment" is intended to include any grouping of data accessible within a database. As such, a data segment may comprise one or more related attributes, and preferably comprises a single row, line, or entry of data from the database. FIG. 3 shows two data segments 152, 154 as an example of the possible organization of a data segment.

Once the data segment 108 is retrieved, the transaction manager module 112 passes the retrieved data segment 108 to the server-side interface module 116. At this point, the data segment 108 is referred to as an "original data segment," because it represents the retrieved data segment 108 as it existed within the addressable base 104 prior to the transaction with the remote site 130.

The server-side interface module 116 formats the original data segment 108 and generates a duplicate copies of the original data segment 108. The copies of the data segment 108 are the modifiable data segment 126 and the state data segment 128. The modifiable and state data segments 126, 128 are in one embodiment formatted into compatible HTML language and stored on the web page 122.

The modifiable data segment 126 is formatted to be viewable on a browser 132. The modifiable data segment 126 is also preferably formatted to be modifiable by a web user, e.g., by over-typing the displayed modifiable data segment 126. Alternatively, the user may return a new modifiable data segment 126 which replaces the original modifiable data segment 126. Once the web user has modified the modifiable data segment 126, it is referred to as an "updated modifiable data segment."

The state data segment 128 preferably accompanies the modifiable data segment 126 when the modifiable data segment 126 is transmitted to the remote site 130. The state data segment 128 is preferably hidden from view, however, and is not viewable with the browser 132. The state data segment 128 also remains unmodified, and as such, does not reflect the modifications to the updated modifiable data segment. The state data segment 128 thus remains suitable for use as a reference to determine the original state of the modifiable data segment 126.

The present invention contemplates that the data segments 108, which are retrievable by the web user, are nonsensitive data segments and do not require application of business logic rules. Thus, web users who do not belong to the enterprise to which the system 100 belongs are able, and in many cases encouraged, to access and update the data segments 108 as desired.

Under the present invention, a web user may rewrite the modifiable data segment 126 in order to update the data segment 126 according to the user's preferences. Thus, a user may update information regarding a customer's address, account number, telephone number, and so forth. The updated modifiable data segment 126 and the state data segment 128 are returned across the Internet 30 and submitted to the server 118. The server module 120 receives the updated data segment 126 and the state data segment 128 and transmits them to the server-side interface module 116.

The HTML language has the advantage of naming in ASCII individual lines of data. Accordingly, it is a simple matter for the server-side interface module 116 to identify the modifiable and state data segments 126, 128 which are resident in a web page 122 as individually identified lines. In one embodiment, the server-side interface module 116 performs a simple mapping exercise to retrieve the modifiable and state data segments 126, 128.

The modifiable and state data segments 126 and 128 are delivered to the generic transaction module 110. The transaction module 112 notes the data segments 126, 128 and accesses the appropriate addressable base 104 to retrieve a current copy of the data segment 108, referred to as the "current data segment." It is possible that during the current update transaction with the remote site 130, the data segment 108 was accessed by another work station and has been updated. If this is the case, the state data segment 128 will no longer mirror the current data segment 108.

The transaction manager module 112 retrieves the current data segment 108 and temporarily locks the current data segment 108. This prevents any updating of the data segment 108 while the comparison is performed. The comparison is preferably of a relatively short duration.

The comparison module 114 compares the state data segment 128 to the current data segment 108. If the state data segment 128 and the current data segment 108 are equivalent, the comparison module 114 determines that the data segment 108 has not been changed during the web user update. Accordingly, the current data segment 108 reflects the original data segment 108 and the web user updated current data.

The transaction manager module 112 then updates the current data segment 108 with the modifiable data segment 126. The end result is that the current data segment 108 is now equivalent to the modifiable data segment 126, or reflects the modifiable data segment 126. In this manner, the IMS 102 is updated and data integrity is maintained. It will be appreciated by one of skill in the art that this process may be repeated for any number of data segment 108.

In the event that the current data segment 108 is not equivalent to the state data segment 128, the comparison module 114 determines that the current data segment 108 has been updated during the web user update. Thus, the user has not updated a current copy of data segment 108.

In such an event, the transaction manager module 112 replaces the modifiable and state data segments 126,128 with the current data segment 108. No changes are made to the current data segment 108. The modifiable and state data segments 126, 128 are retransmitted to the remote site 130. In one embodiment, the data segments 126, 128 are transmitted together with a message to indicate that the original data segment 108 has been changed before the web user completed the web user's update. The web user may then be instructed to attempt another update.

The locking of the current data segment 108 is conducted only for a brief amount of time that it takes the generic transaction module 110 to retrieve the current data segment 108 and compare it to the state data segment 128. The comparison is a relatively short duration as it is performed within the IMS 102. It is necessary to lock the current data segment 108 for this brief period of time in order to ensure that data integrity is maintained. If the state data segment 128 is equivalent to the data segment 108, the lock is terminated after the current data segment 108 is updated to reflect the modifiable data segment 126. If the current data segment 108 is not equivalent to the state data segment 128, the lock is terminated at the end of the comparison.

In this manner, the states of the data segments 108 are kept external to the IMS 102. The only expense is a slight increase in the amount of data transferred across the Internet 30. However, the invention solves the problem of maintaining, storing, and constantly updating state data at the IMS 102. Furthermore, the present invention maintains a consistent optimistic locking protocol that protects the data segments 108 from unintended changes.

To recap, the web page 122 is set up to display data segments 108 which satisfy a web user's request. These data segments 108 are duplicated into modifiable and state data segments 126, 128 by a data segment duplicator module. The state data segment 128 is a hidden copy and cannot be changed. The whole web page 122 is sent to the user with both the modifiable and state data segments 126, 128. The modifiable and state data segments 126 and 128 are returned to the IMS 102 with any updates to the modifiable data segment 126.

Every time a web user returns the modifiable data segment 126 with an update, the state data segment 128 is returned with it. Throughout all transmissions, these dual data segments are transmitted. The IMS 102 receives the unchanged state data segment 128 in order to determine whether the current data segment 108 has changed. If there has been a change to the current data segment, the IMS 102 can reject the update and send notice back to inform the web user that the current data segment 108 has changed since the web user last saw it, and the web user will need to reapply the web user's change to the modifiable data segment 126. If the current data segment 108 has not changed, the IMS 102 proceeds and applies the user's change.

The invention allows for scaling for many more additional web users without depleting central resources found in the server 118 and the IMS 102. The invention allows for maintenance of optimistic locking and database integrity and allow updates from a web browser environment. As long as the server 118 and the IMS 102 can handle the transaction rates, scalability for many more users is possible. Thus, depletion of central resources, which would prevent scalability, is avoided by maintaining state data external of the IMS 102. A conventional IMS 102 may be utilized and maintains its performance.

The invention further has the advantage of being self-policing. If a web user does not return a modifiable data segment 126, the web user's changes are not incorporated. If a web user does not return an update there is no loss to the server 118 or the IMS 102. No additional management is required if a requested data segment 108 is sent to a web user and never returned. Data transferability and bandwidth are becoming increasingly less expensive and may therefore be utilized to carry the state data. Memory storage is relatively inexpensive, but managing huge amounts of memory storage at a central location on a scale anticipated for a web environment is an expensive proposition.

The invention takes advantage of current browser technology in that current browsers 132 currently employ suitable mechanisms to access and transmit a web page 122 intact. The browser 132 interprets the web page 122 as it is shown on a display screen. The web page 122 can be sent back to the server 118 and may include various fields within the web page 122 which may be displayable or not. The server module 120 is to parse a web page 122 to discard or keep any fields or items as desired.

Referring to FIG. 3, shown therein is one embodiment of a data segment table 148 containing examples of modifiable and state data segments 126, 128. The data segment table of FIG. 3 is shown as it would be displayed to a web user. In one embodiment, the data segment table 148 includes modifiable data segments 152, 154 in the form of rows of data attributes 150. The modifiable data segments 152, 154 are returned, based on a web user's request. Thus displayed, a web user may review the modifiable data segments 152, 154 and make any desired updates.

FIG. 4 shows the data segment table 148 in its entirety. As in FIG. 3, the data segment table 148 includes data attributes 150 making up modifiable data segments 152, 154. The data segment table 148 also includes state data segments 156, 158 corresponding to the modifiable data segments 152, 154. As discussed, the state data segments 156, 158 are preferably not displayed to a web user and may not be updated by a web user.

FIG. 5 shows the data segment table 148 with a now updated modifiable data segment 152. FIG. 5 differs from FIG. 4 in that the modifiable data segment 152 has been updated to reflect a new extension number. It should be noted that the corresponding state data segment 156 has not been changed and remains constant. The modifiable data segment 154 has not been updated in FIG. 5 to illustrate that updates may or may not be made, at the discretion of the web user.

All data segments 152, 154, 156, 158 are returned to the server 118 and processed by the server module 120. The server module 120 parses out the data segments 152, 154, 156, and 158 and sends them to the server-side interface module 116. Comparison of the current state of the data segments 108 to the state data segments 156, 158 is performed in the manner previously discussed. Confirmation of the current state of state data segment 156 allows an update based on the change to modifiable data segment 152.

Figure 6:
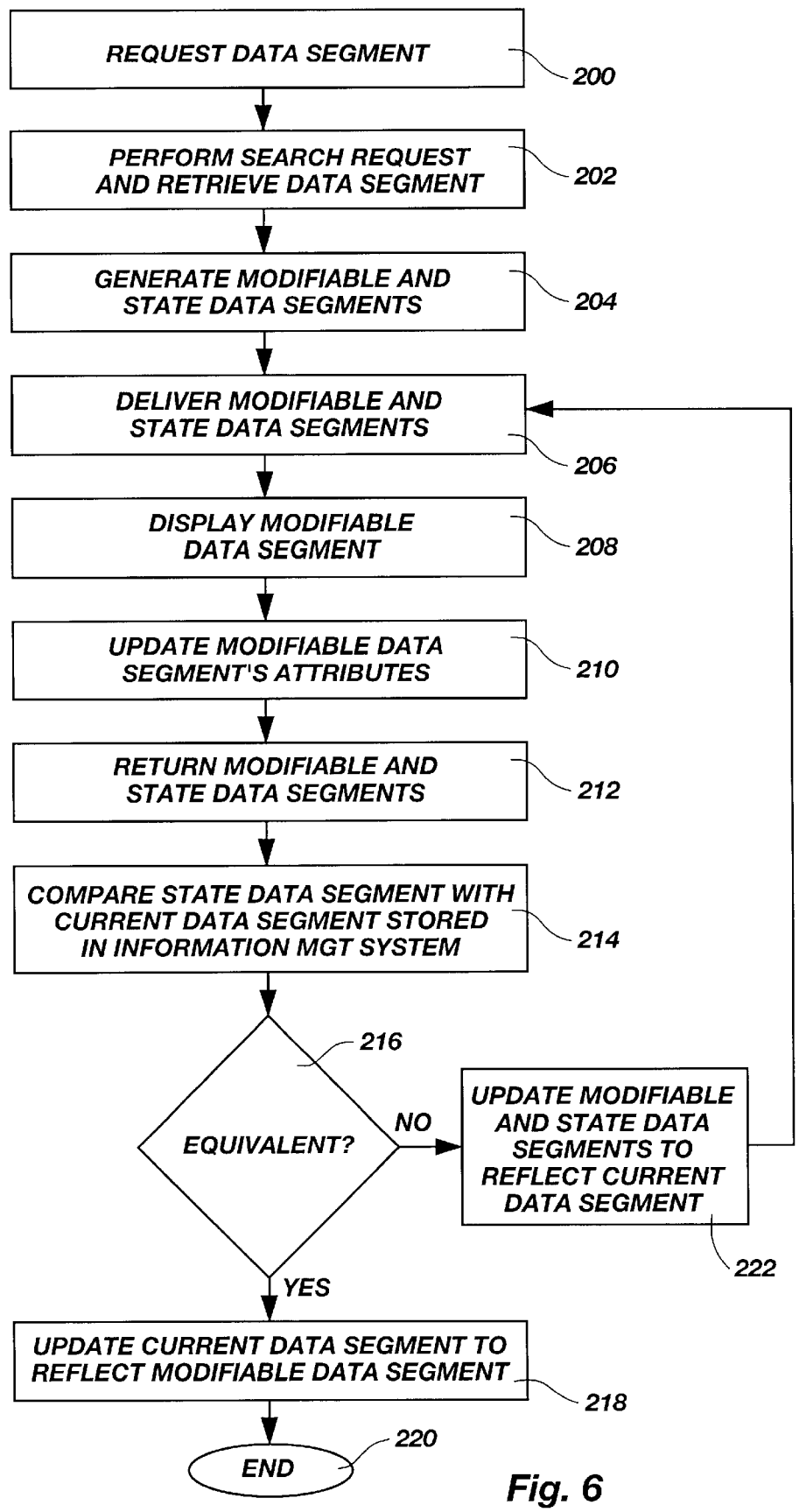
FIG. 6 is a schematic flow chart illustrating one embodiment of a method of using the Internet-enabled data locking system of FIG. 2.

Referring to FIG. 6, shown therein is a flow diagram which incorporates one embodiment of a method of use of the System 100 of FIG. 2. In a step 200 of FIG. 2, a request for data is received from a user. In step 202, the IMS 102 performs a search and retrieves one or more data segments 108 which satisfy the search request. In a step 204, the data segment 108 is duplicated by the server side interface module 116 of FIG. 2 to create modifiable and state data segments 126, 128.

In a step 206, the modifiable and state data segments 126,128 are delivered to the remote site 130. As previously explained, the modifiable data segment 126 may be updated, whereas the state data segment 128 preferably remains constant.

In a step 208, the modifiable data segment 126 is displayed to a web user. In a step 210 the web user may update specific attributes of the modifiable data segment 126. In a step 212, the modifiable and state data segments 126, 128 are returned to the server 118.

In a step 214, the state data segment 128 is compared with a current data segment 108 which has remained in storage in the IMS 102. In a step 216, a determination is made for equivalence between the state data segment 128 and the current data segment 108. If equivalent, the process continues to a step 218. In the step 218, the attributes of the current data segment are updated to reflect the attributes of the modifiable data segment 126. The method then terminates at a step 220.

If the state data segment 128, and the current data segment 108 are not equivalent, then the method proceeds to step 222. In step 222, the modifiable and end state data segments 126, 128 are updated to reflect the attributes of the current data segment 108. The method then continues back to step 206 wherein the modifiable and state data segments 126, 128 are delivered to the web user. In this manner, a web user is able to update the modifiable data segment 126 based on the current state.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for allowing a user at a remote site to update data stored in a database while maintaining the integrity of the data using a client-side optimistic lock, the apparatus comprising:
   a processor for executing instructions; and
   a memory device storing modules executable by the processor, the modules comprising:
      a transaction manager module configured to retrieve an original data segment from the database in response to a search request from the user;
      a data segment duplicator module configured to generate two copies of the original data segment, a modifiable data segment to be modified at the remote site and a state data segment to be unaltered for transmission to the remote site; and
      a comparison module configured to receive an updated modifiable data segment and the state data segment from the remote site and compare the state data segment with a current data segment to determine equivalence thereof and to lock and update the current data segment to reflect the updated modifiable data segment upon a determination of equivalence.

2. The apparatus of claim 1, further comprising a server adapted to effect communications between the data segment duplicator module and the remote site and wherein the data segment duplicator module comprises a server-side interface module configured to interact with the server to deliver and receive data segments.

3. The apparatus of claim 2, further comprising an IMS for managing the data stored in the database, and wherein the server-side interface module operates within the IMS.

4. The apparatus of claim 2, wherein the server-side interface module is further configured to generate the state data segment into a non-displayable format.

5. The apparatus of claim 3, wherein the server-side interface module is further configured to generate the modifiable and state data segments into HTML format.

6. The apparatus of claim 1, wherein the comparison module is further configured to compare the state and current data segments to determine non-equivalence, and to update the modifiable and state data segments to reflect the current data segment upon non-equivalence.

7. The apparatus of claim 6, wherein each data segment comprises data attributes and the comparison module is further configured to determine equivalence and non-equivalence based on a comparison of the data attributes of the state and current data segments.

8. The apparatus of claim 6, wherein the transaction manager module is further configured to lock the current data segment during comparison of the state and current data segments by the comparison module.

9. A method for accessing a database across a network and updating data stored on the database while maintaining data integrity via a client-side optimistic lock, the method comprising:
   retrieving an original data segment in response to a search request received from a remote sire on the Internet;
   generating two copies of the original data segment, a modifiable data segment to be modified at the remote site and a state data segment to be unaltered;
   transmitting the modifiable data segment and the state data segment to the remote site;
   receiving an updated modifiable data segment and the state data segment from the remote site; and
   comparing the state data segment with a current data segment in the database.

10. The method of claim 9 further comprising updating the current data segment to reflect the updated modifiable data segment upon a determination that the state data segment and the current data segment are equivalent.

11. The method of claim 9 further comprising:
   updating the modifiable and state data segments to reflect the current data segment upon a determination that the state data segment and current data segment are non-equivalent; and
   retransmitting the modifiable and state data segments to the remote site.

12. The method of claim 9, further comprising:
   updating, at the remote site, the modifiable data segment to reflect user preferences; and
   maintaining the state data segment constant.

13. The method of claim 9, wherein each data segment comprises data attributes and wherein comparing the state data segment with the current data segment further comprises comparing the data attributes of the state data segment and the data attributes of the current data segment.

14. The method of claim 9 further comprising locking the current data segment during the step of comparing the state data segment with the current data segment.

15. The method of claim 9, wherein transmitting the modifiable data segment and the state data segment to the remote site comprises transmitting the modifiable data segment and the state data segment over the Internet.

16. A method for accessing a database across a network and updating data stored on the database while maintaining data integrity comprising:

retrieving an original data segment in response to a search request received from a remote site on the Internet;

generating a modifiable data segment and a state data segment based on the original data segment;

transmitting the modifiable data segment and the state data segment to the remote site, wherein transmitting the modifiable data segment and the state data segment to the remote site further comprises formatting the modifiable data segment and the state data segment into HTML;

receiving an updated modifiable data segment and the state data segment from the remote site; and comparing the state data segment with a current data segment in the database.

17. A method for accessing a database across a network and updating data stored on the database while maintaining data integrity comprising:

retrieving an original data segment in response to a search request received from a remote site on the Internet;

generating a modifiable data segment and a state data segment based on the original data segment;

formatting the state data segment into a non-displayable format;

transmitting the modifiable data segment and the state data segment to the remote site;

receiving an updated modifiable data segment and the state data segment from the remote site; and comparing the state data segment with a current data segment in the database.

18. A computer readable medium having stored thereon computer executable instructions for performing a method for accessing a database and updating data on the database in a stateless network environment while maintaining data integrity, the method comprising:

retrieving an original data segment in response to a search request using a stateless protocol received from a remote site on the network;

generating two copies of the original data segment, a modifiable data segment to be modified at the remote site and a state data segment to be unaltered;

transmitting the modifiable data segment and the state data segment to the remote site using a stateless protocol;

receiving an updated modifiable data segment and the state data segment from the remote site; and comparing the state data segment with a current data segment in the database.

19. The computer readable medium of claim 18 wherein the method further comprises updating the current data segment to reflect the updated modifiable data segment upon a determination that the state data segment and the current data segment are equivalent.

20. The computer readable medium of claim 18 wherein the method further comprises:

updating the modifiable and state data segments to reflect the current data segment upon a determination that the state data segment and current data segment are non-equivalent; and retransmitting the modifiable and state data segments to the remote site.

21. The computer readable medium of claim 18 wherein transmitting the modifiable data segment and the state data segment to the remote site further comprises formatting the modifiable data segment and the state data segment into HTML.

22. The computer readable medium of claim 18 wherein the method further comprises formatting the state data segment into a non-displayable format.

23. The computer readable medium of claim 18 wherein the method further comprises:

updating, at the remote site, the modifiable data segment to reflect user preferences; and maintaining the state data segment constant.

24. The computer readable medium of claim 18 wherein each data segment comprises data attributes and wherein comparing the state data segment with the current data segment further comprises comparing the data attributes of the state data segment and the data attributes of the current data segment.

25. The computer readable medium of claim 18 wherein the method further comprises locking the current data segment during the step of comparing the state data segment with the current data segment.

26. The method of claim 18 wherein transmitting the modifiable data segment and the state data segment to the remote site comprises transmitting the modifiable data segment and the state data segment over the Internet.

27. A method for database update in a stateless environment that allows updates without locking the database or tracking update requests by the database management system, comprising:

sending, to a client-portion of a requestor, two copies of state data, one to be modified and the other left unaltered, over a communications network, the state data reflecting the state of the data in the database when sent;

receiving, from the requester, modified data and the state data, the modified data being modified state data and to be used to update the database; and if the state data is equivalent to the current data in the database, updating the database to reflect the modified data.

28. A method as recited in claim 27 wherein sending is accomplished using HTML pages transported according to the Hyper-Text Transport Protocol.

29. A method as recited in claim 27 wherein the client-portion of a requestor is a web browser processing HTML pages, sending is accomplished using HTML pages transported according to the Hyper-Text Transport Protocol, and sending the two copies of state data comprises sending one to be modified that is viewable on the browser and the other left unaltered that is hidden from view on the browser.

30. A method as recited in claim 27 wherein the current data is locked while being compared to state data for equivalence and if equivalent, updating the database.

31. A method as recited in claim 27 further comprising:

if the state data is not equivalent to the current data, sending, to the requestor, the current data as the new state data.

32. An article of manufacture comprising a computer program carrier embodying one or more instructions that, when used by a computer, causes the computer to perform the method as recited in claim 27.

* * * * *